(12) United States Patent  (10) Patent No.: US 6,640,082 B2
Mitomi  (45) Date of Patent: Oct. 28, 2003

(54) IMAGE READING APPARATUS

(75) Inventor: Yuuichi Mitomi, Kofu (JP)

(73) Assignee: Nisca Corporation, Yamanashi-Ken (JP)

( * ) Notice: Subject to any disclaimer, the term of this patent is extended or adjusted under 35 U.S.C. 154(b) by 0 days.

(21) Appl. No.: 09/987,200

(22) Filed: Nov. 13, 2001

(65) Prior Publication Data
US 2002/0098023 A1 Jul. 25, 2002

(30) Foreign Application Priority Data

Nov. 13, 2000 (JP) ........................................ 2000-345818
Dec. 11, 2000 (JP) ........................................ 2000-376433
Feb. 22, 2001 (JP) ........................................ 2001-046817

(51) Int. Cl.$^7$ ............................................... G03G 15/00
(52) U.S. Cl. ......................... 399/374; 355/23; 358/496
(58) Field of Search ............................... 399/367, 374, 399/203; 355/23, 24; 358/474, 496, 498

(56) References Cited

U.S. PATENT DOCUMENTS 5,267,058 A * 11/1993 Sata ........................... 358/498
6,323,933 B1 * 11/2001 Anzai ........................... 355/23
2002/0036809 A1 * 3/2002 Tohyama et al. ........... 358/498
2002/0039207 A1 * 4/2002 Kanda ........................ 358/498

FOREIGN PATENT DOCUMENTS

JP     11-69086        3/1999

OTHER PUBLICATIONS

Patent Abstract of Japan; Publication No. 01–173963, Oct, 7, 1989.
Patent Abstract of Japan; Publication No. 11–069087, Sep. 3, 1999.
Patent Abstract of Japan; Publication No. 11–069086, Sep. 3, 1999.

* cited by examiner

Primary Examiner—Susan S.Y. Lee
(74) Attorney, Agent, or Firm—Kanesaka & Takeuchi

(57) ABSTRACT

An image reading apparatus for reading originals, which is transported one at a time, at a predetermined reading station is provided with a first reading station for reading one side of the originals at a bottom of a U-shaped transport path for guiding the originals from a document supply tray to a discharge tray and a second reading station for reading the other side of the originals in a straight portion of a discharge tray for stable reading of the originals. A guide unit forming the second reading station is detachable from below to improve maintainability, and is equipped with an adjustment device for easy adjustment of inclination of the reading unit for reading the originals that pass through the second reading station.

13 Claims, 15 Drawing Sheets

IMAGE READING APPARATUS

BACKGROUND OF THE INVENTION

This invention relates to an image reading apparatus provided with an automatic document feeder for drawing out originals stacked on a sheet supply tray and feeding to an original reading station one by one, and more particularly an image reading apparatus for reading both front and back sides of an original simultaneously.

An image reading apparatus, ordinarily called a scanner, optically reads images on the original, converts the images to electronic data and transmits that data to image forming apparatus such as an external personal computer, copier or facsimile machine. Most of image forming apparatus are provided with such image reading apparatus.

The image reading apparatus is provided with a light source for irradiating light to an original that is drawn out and fed one by one from a sheet supply tray by an automatic document feeder and an image sensor that receives the light reflected from a surface of the original. There are an image reduction type image reading apparatus that uses an image sensor such as CCD and a contact image sensor type image reading apparatus in which a line-shaped light source and a line image sensor are disposed in close proximity to an original transport path traversing a width direction of the original (a main operating direction).

For either type of the image sensors, it is important for the original in the image reading apparatus to move consistently with a predetermined and constant speed, and as closely to an image reading surface of the image reading apparatus as possible to read the original as finely as possible and without jittering. Particularly, the contact image sensor type image sensors have a much shallower focus depth compared to that of the image reduction type, so it is necessary for the original to move closer to the image reading surface of the image reading apparatus. For this reason, it is preferable that the contact image sensor is disposed in a position where the original will move as linearly thereto as possible.

However, recent image reading apparatus have been designed to have two individual reading means to simultaneously read images on both front and back sides of the originals transported one at a time by an automatic document feeder with one pass thereof without such a complex transport control as switch back.

In such conventional image reading apparatus with a two-side reading function, many apparatus use the contact image sensor type sensor disposed in an automatic document feeder for reading images on at least one side of the original to allow for the automatic document feeder to be more compact.

As an example of the prior art, Japanese Patent Publication (KOKAI) No. 11-69086 disclosed an apparatus having two reading means on both sides of an original transport path. First image reading means (the image reduction type) moves below a first platen, which is for a thick original to be placed thereupon, to read the original, and also it reads one side of the original transported on a second platen situated below large rollers of an automatic document feeder in a stationary state. Second reading means (the contact image sensor type) is disposed on a parallel linear transport path established at downstream of the transport path of the second platen. The parallel linear transport path is located next to where the original is lifted from the second platen and transported upward around an outer circumference of the transport drum 11. A double-side image reading apparatus structured to simultaneously read both sides of an original using the first and second reading means is disclosed.

However, the prior art described above has the parallel linear transport path in the direction of discharging the original after transporting the original upward along the outer circumference of the large transport roller, and the second reading means disposed in that path. The original is transported therefrom toward an upward original discharge outlet, so the automatic document feeder needs to be extended not only in the direction of discharging the original, but also in the thickness direction of the apparatus. Such an original discharge path can have only the reading station of the second reading means to be planar, and linearity for the entire transport path is not obtained. The original travels in a curved state at least in a short path, so high quality image reading is not ensured.

Also in the prior art, because the contact image type second reading means incorporated into the automatic document feeder is positioned at back of the device unit, it is difficult to clean the backup guide surface facing the reading surface of the reading unit, making maintenance a problem.

Furthermore, when mounting the second reading means to the automatic document feeder, the mounting position of the reading means can be deviated due to variations in parts or assembly errors. Such deviation in mounting position causes a shift in an angle of the reading line of the reading means with respect to the original.

In other words, the actual reading line would be shifted from a proper reading line for reading the original because of the incorrect mounting of the reading means. In such a case, when an image is formed by the image forming apparatus such as a copier or printer, the formed image is distorted by the angle with regard to the image on the original.

OBJECT OF THE INVENTION

In view of the problems of the prior art, an object of the present invention is to provide an image reading apparatus that does not cause distorted or out-focus image data read from both sides of an original. An object of the present invention is also to provide an image reading apparatus that makes cleaning of reading surfaces of the reading means and guide surfaces facing thereto easy, resulting in good workability in maintenance. Further, the image reading apparatus is capable of reading high-quality image, and mounting adjustment of the reading means becomes easy with little errors.

SUMMARY OF THE INVENTION

In order to achieve the aforementioned objects, an image reading apparatus according to the present invention is provided with: a platen for reading an original; first reading means for reading one side of the original transported over the platen; a sheet supply tray for stacking the originals; a discharge tray for storing the originals that have been read; a sheet transport path including a sheet feeding path for guiding the originals on the sheet supply tray to the platen, and an original discharge path formed in a straight line oblique to the platen surface for lifting the originals from the platen and guiding the originals to the discharge tray; and second reading means disposed in the linear original discharge path between the platen and the discharge tray for reading the other side of the original.

Further, an image reading apparatus according to the present invention is provided with: a platen for reading an original; first reading means for reading one side of the stationary original on the platen while moving as well as for reading one side of the original transported over the platen; cover means for covering at least a part of the platen; a sheet supply tray for stacking the originals; a discharge tray for storing the originals that have been read; a sheet feed path for guiding the originals on the sheet supply tray to the platen; a discharge path disposed at an upper portion of the cover means for lifting the originals from the platen and for guiding them to a discharge tray; second reading means for reading the other side of the originals disposed in the discharge path; guide means established opposite to the second reading means for guiding the originals to be read by the second reading means and forming a part of the discharge path; and fastening means for mounting the guide means to be removable from the cover means and exposing a reading surface of the second reading means.

Further, an automatic document feeder mounted on a main body of a document reading device is provided with reading means for reading images on the original, and support means for supporting the reading means to swing freely in the original transport direction in order to adjust inclination of the original transport direction of the reading means.

DESCRIPTION OF THE PREFERRED EMBODIMENTS

Figure 1:
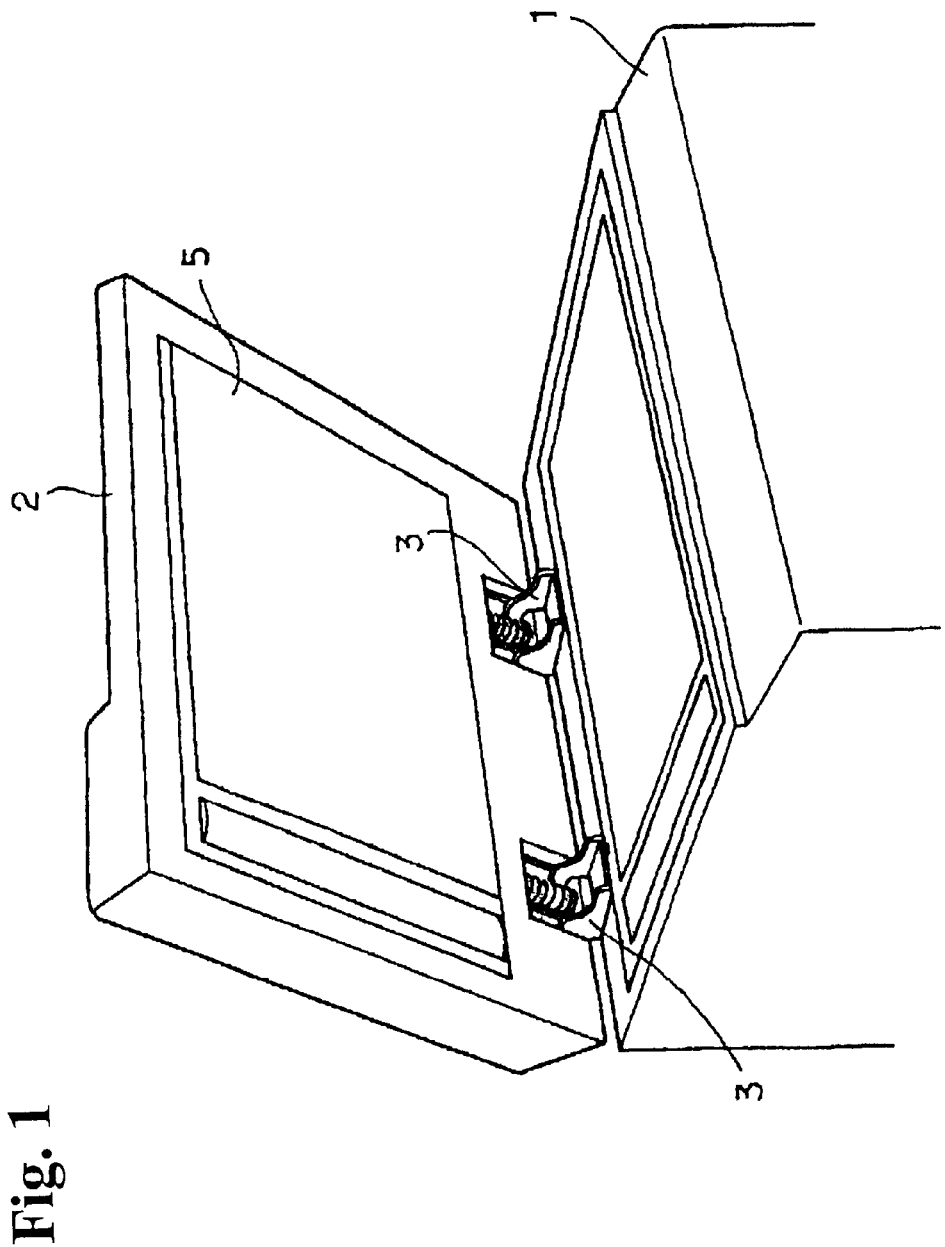
FIG. 1 is a view of an automatic document feeder provided on a main body of a document reading device according to the present invention.
Figure 2:
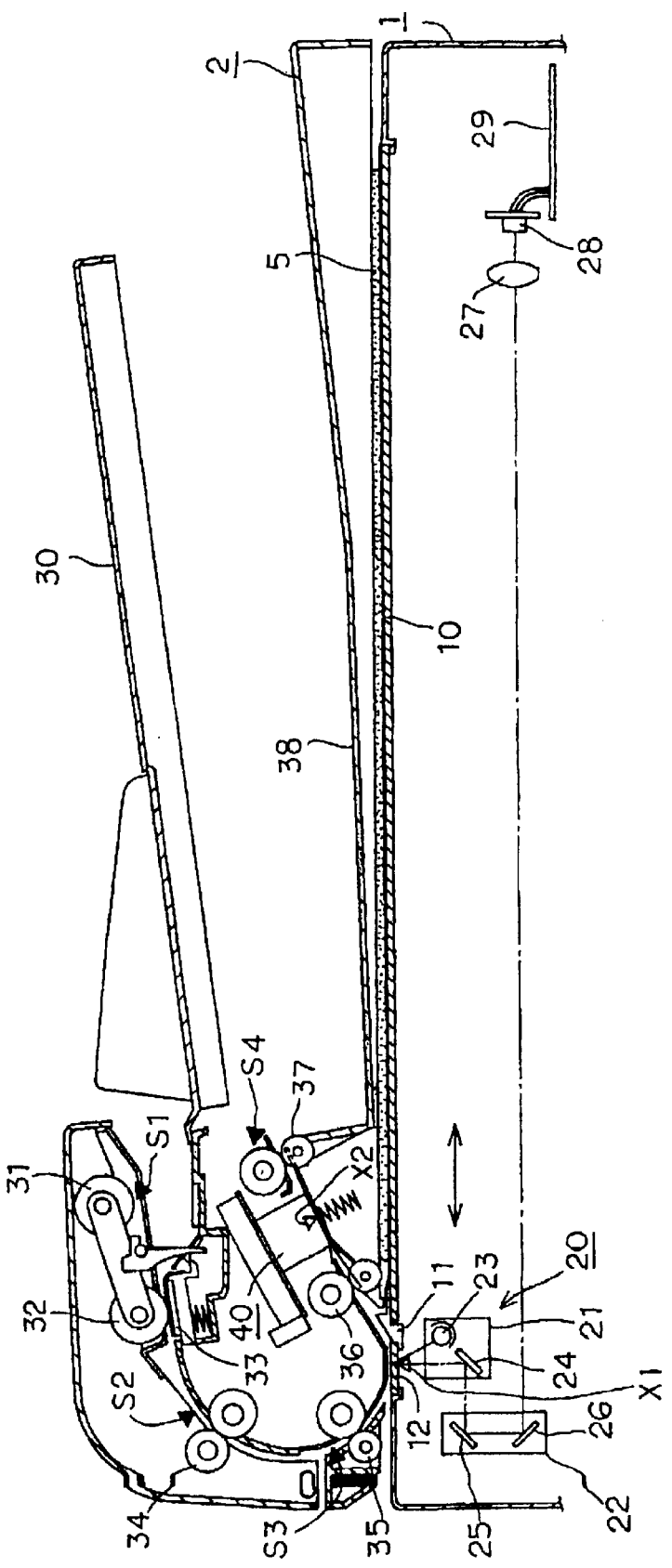
FIG. 2 is a sectional view of an entire image reading apparatus provided with the automatic document feeder according to the present invention.

In explaining a configuration of an document reading apparatus according to the present invention with reference to FIG. 1 and FIG. 2, reference numeral 1 denotes the document reading apparatus unit for reading an original, and reference numeral 2 denotes an automatic document feeder. The automatic document feeder is mounted to an upper surface of the document reading apparatus by a hinge device 3 so that the automatic document feeder can rotate freely.

The document reading apparatus unit 1 is provided with a first contact glass 10 for placing thick originals on one side of the top thereof, and a thick original positioning member 11 on the other side thereof. Inside thereof, disposed are a first carriage 21 comprising a light 23 for an image reduction optical system and a reflective mirror 24, a second carriage 22 comprising a second reflective mirror 25 and a third reflective mirror 26, and first reading means 20 composed of a lens 27, photoelectrical conversion means (CCD) 28 and a control printed circuit board 29.

A second contact glass 12 for sheet originals is mounted to the thick original positioning member 11. The first and second carriages 21 and 22 move at a speed ratio of 2:1 by a wire or a timing belt (not shown) driven by a motor (not shown) to scan the thick originals placed on the first contact glass 10. The first and second carriages 21 and 22 also stop below the second contact glass 12 to scan the sheet originals transported by the automatic document feeder 2. An image of the scanned original is created on the CCD 28, converted into electrical signals and processed on the control printed circuit board 29.

Alternatively, an image reduction type optical system consisted of a plurality of mirrors, a lens and the CCD may be used as one unit to scan the thick originals on the first contact glass 10.

The automatic document feeder 2 is provided with a pressing cover 5 to cover the first contact glass 10 on the document image reading apparatus 1, a transport mechanism to feed the originals, a sheet supply tray 30 for stacking the originals, a discharge tray 38 for storing the originals and second reading means 40 for reading the back side of the originals.

Figure 4:
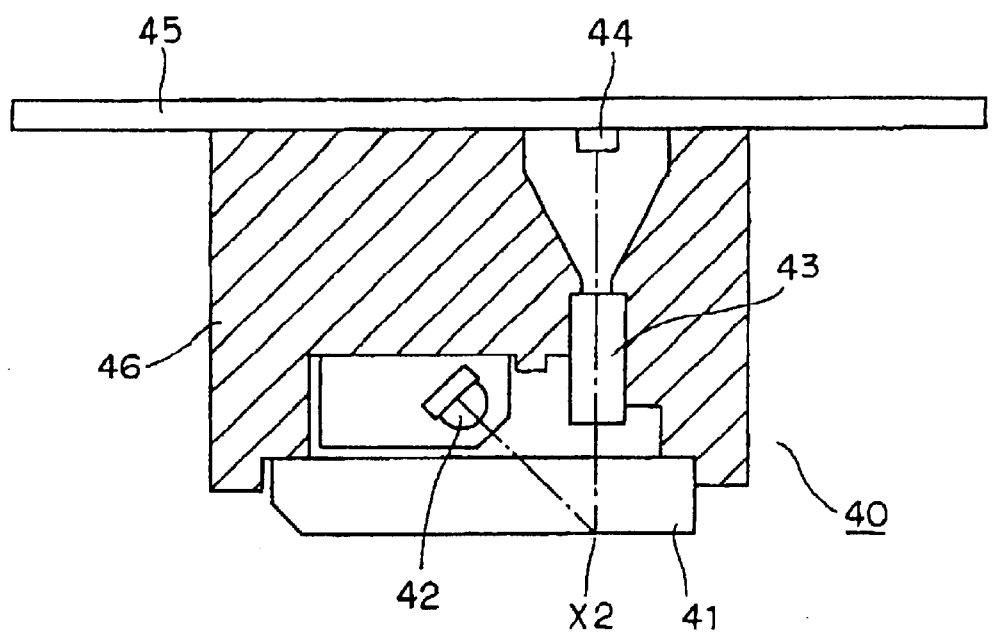
FIG. 4 is a sectional view of a configuration of a contact image sensor type optical unit (second reading means) according to the present invention.

The second reading means 40 is a contact image type equivalent size image sensor, and, as shown in FIG. 4, is a unit attached to the holder 46 comprising a contact glass 41, an LED light source 42, a SELFOC lens 43, an image sensor 44 and an image processing printed circuit board 45.

Figure 3:
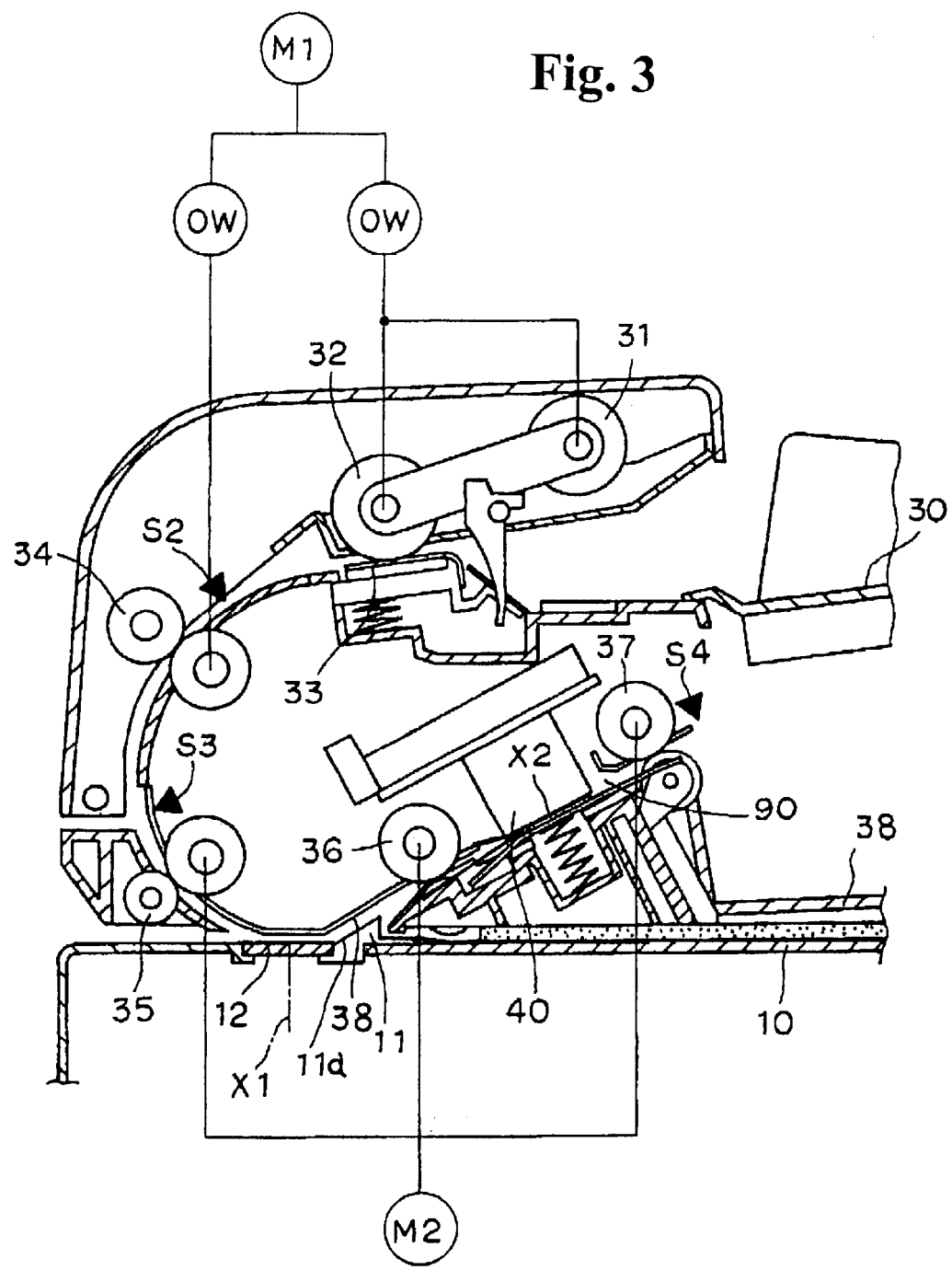
FIG. 3 is an expanded sectional view of the essential portion of the automatic document feeder according to the present invention.

As shown in detail in FIG. 3, the original transport mechanism forms a U-shaped curved transport path, and a first reading position X1 for the first reading means 20 and a second reading position X2 for the second reading means 40 are disposed with an interval on the transport path.

Further, the original transport mechanism has separation means composed of a pickup roller 31 for feeding the uppermost sheet from the originals stacked on the sheet supply tray 30, the paper feed roller 32 for separating the fed originals into one sheet and feeding it, and the separation pad 33; and a pair of resister rollers 34 that aligns the leading edges of the originals and sends them. The pickup roller 31, the paper feed roller 32, and a pair of the resister rollers 34 feed the originals by forward and reverse drive of a paper feed motor M1.

Also, the original transport mechanism has a pair of transport rollers 35 and 36 for transporting the originals to the first reading position X1 on the second contact glass 12 and the second reading position X2 on the contact glass 41 of the second reading means 40, and a pair of discharge rollers 37 for discharging the originals to the discharge tray 38 at front and back sections of the aforementioned second contact glass 12 on the document image reading apparatus 1. A pair of the transport rollers 35, 36 and a pair of the discharge rollers 37 are driven by a transport motor M2 to transport and discharge the originals.

Figure 5:
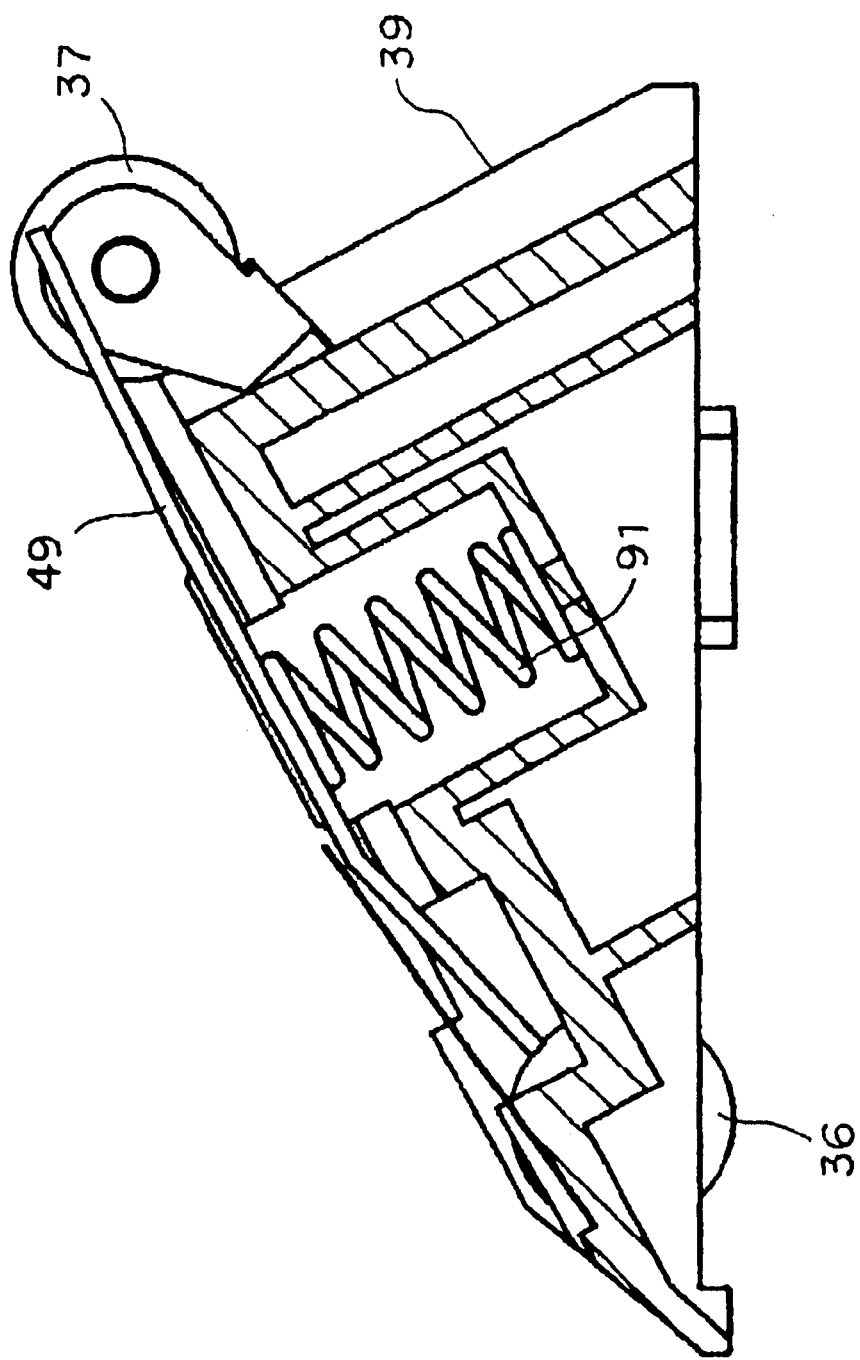
FIG. 5 is a sectional view of a configuration of a guide unit according to the present invention.

The following section will describe a structure of a second reading station that has a second reading position shown in FIG. 3 and FIG. 5.

The second reading station forms a linear path 90 including a slant guide 49 connecting the reading surface of the second contact glass 12 and a paper discharge outlet of the discharge tray 38, and a pair of the transport rollers 36 and a pair of the discharge rollers 37 are situated at upstream and downstream to sandwich the second reading means 40.

FIG. 5 shows a guide unit 39 integrated with a guide 49 facing a contact glass 41, an urging spring 91 for urging the guide 49 to the contact glass 41, one of the paired transport rollers 36, and one of the paired discharge rollers 37. The guide unit 39 can be removed from a frame 100 of the automatic document feeder 2, as described later.

In the structure described above, the originals read at the first reading position X1 on the second contact glass 12 and lifted by a lifting surface 11a of the positioning member 11 is guided to the slant linear portion 90. The originals led to the slant linear portion 90 are transported by a pair of the transport rollers 36 and the discharge rollers 37 along the slant linear portion 90 to be read by the second reading means 40 at the second reading position X2.

As described above, the second reading means 40 is the contact image type sensor and has a shallower focus depth than that of the image reduction type sensor of the first reading means 20, so it is essential to ensure that the originals are transported in a stable manner and in close proximity to the reading surface. To achieve this, the gap in the original transport path in the second reading station is set to be small. By forming the straight linear reading path in the second reading station, the originals can be transported smoothly to make it possible to obtain stable images.

Furthermore, in usual usage, regular or as needed maintenance such as cleaning is necessary because paper dust, ink from the originals, toner and the like thereon adhere to the contact glass of the reading station of an apparatus and the back-up guide facing the contact glass in this embodiment of the present invention.

For that reason, the linear path 90 in the second reading station where the second reading means 40 of the automatic document feeder 2 is disposed can be opened so that the contact glass 41 surface and guide 49 surface are easily exposed.

Figure 6:
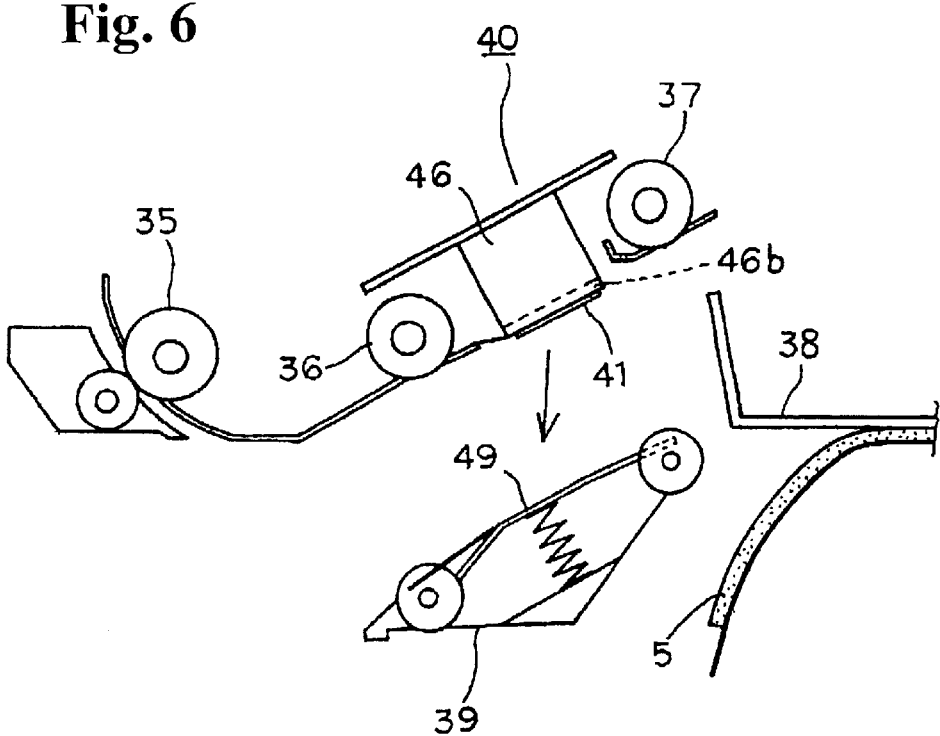
FIG. 6 is a conceptual view of a detachable configuration of the guide unit according to the present invention.

As can be seen in FIG. 6, the guide unit 39 facing the second reading means 40 is detachably mounted by a screw from a side of a pressing cover 5.

Figure 7:
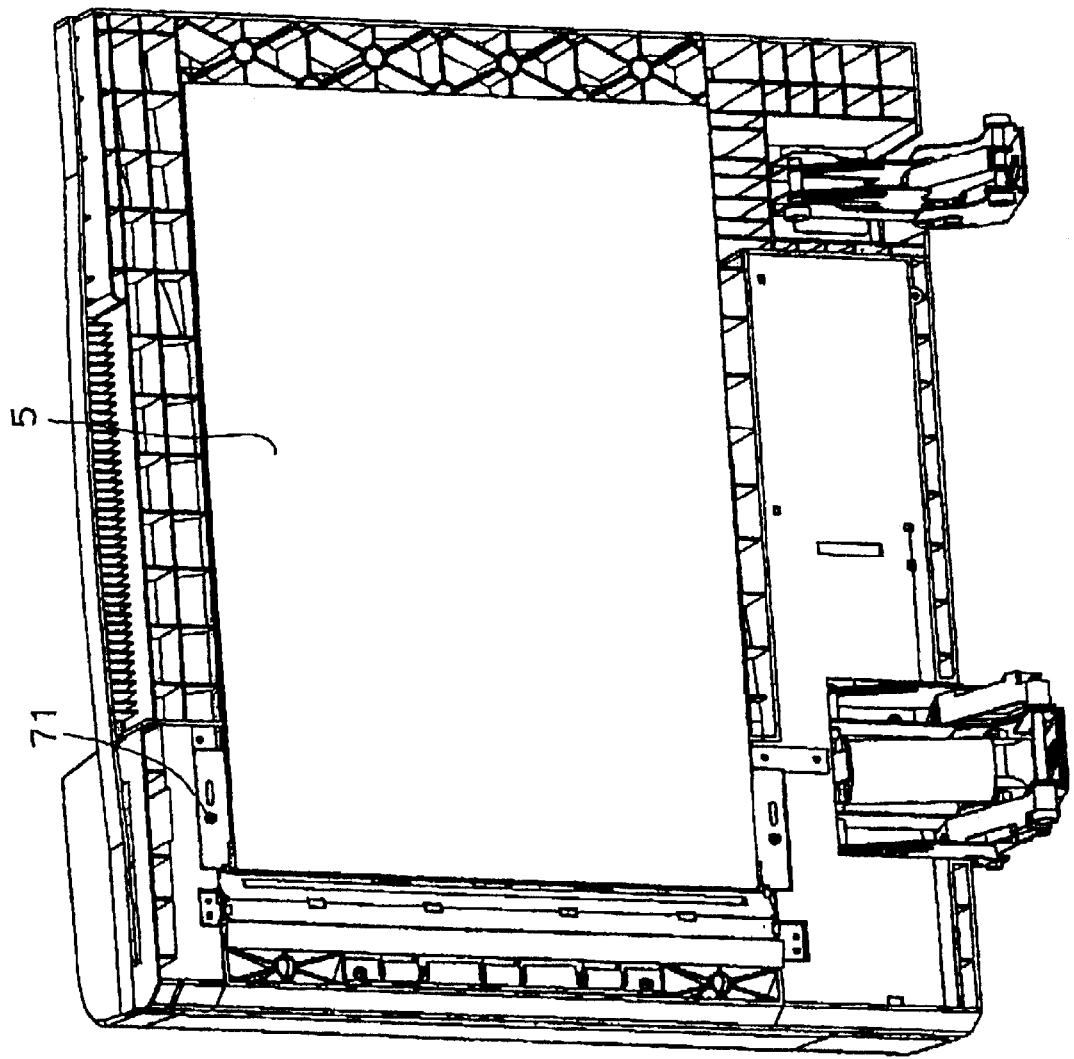
FIG. 7 is a perspective view showing the automatic document feeder of the present invention in an opened state.

FIG. 7 shows a bottom surface of the automatic document feeder 2 in an open state. The guide unit 39 is disposed inside the pressing cover 5 that contacts the first contact glass 10 located below the second reading means 40 for reading the other side of the original when the bottom surface of the automatic document feeder 2 is closed over the original image reading apparatus 2. The pressing cover 5 is configured so that at least a portion storing the guide unit 39 is removable.

Figure 8:
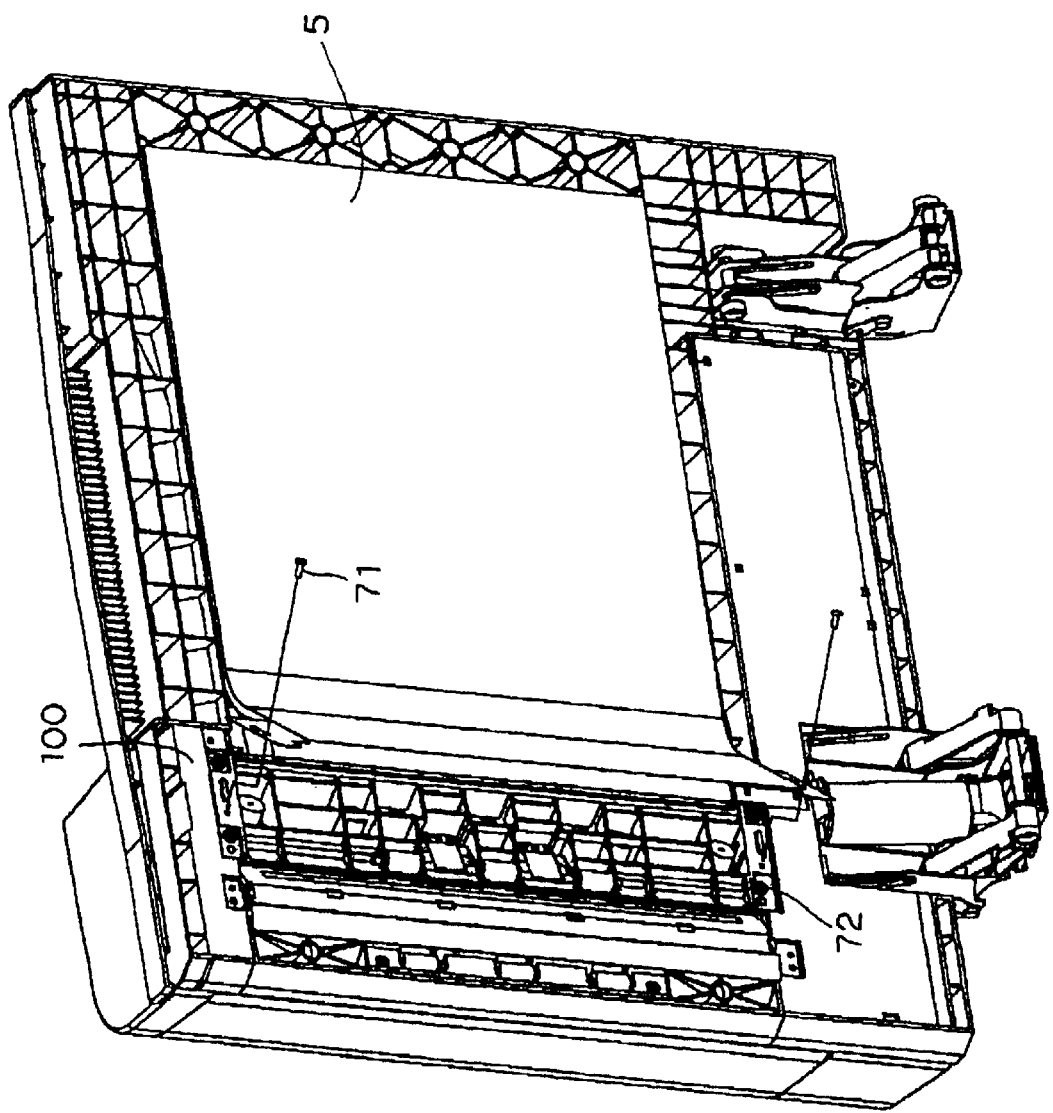
FIG. 8 is a perspective view showing the automatic document feeder of the present invention when it is opened and a pressure cover is taken off.

FIG. 8 shows a state that a portion of the pressing cover 5 shown in FIG. 7 is removed.

At both sides of the pressing cover 5 on the guide unit 39 side, attachment brackets are mounted to the frame 100 by a single screw 71. The pressing cover 5 can be easily removed toward front by removing the two screws 71. Taking off the pressing cover 5 exposes the guide unit 39.

Figure 9:
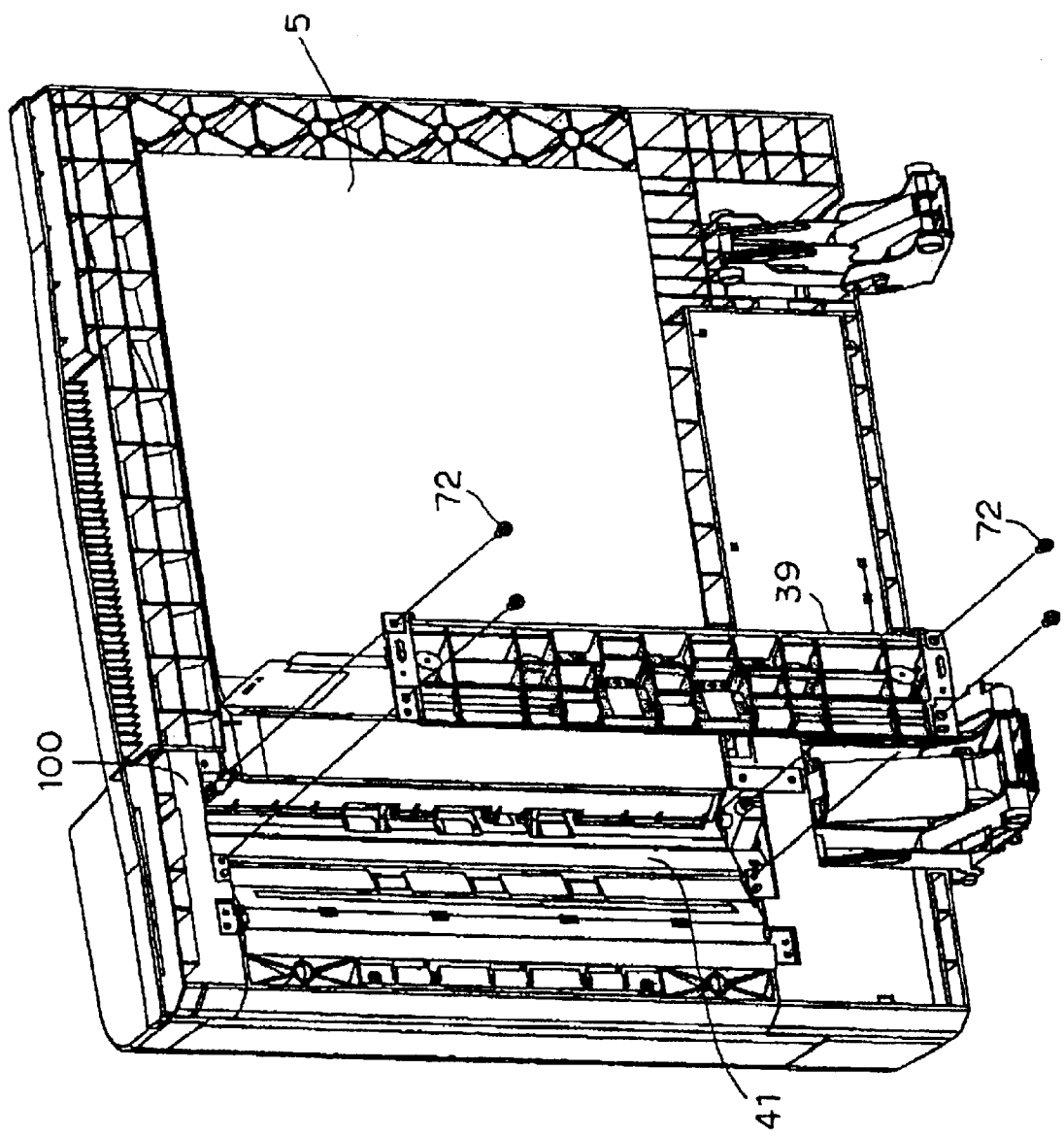
FIG. 9 is a perspective view showing the automatic document feeder of the present invention when it is opened and the guide unit is removed.

FIG. 9 shows a state that the guide unit 39 is removed. The guide unit 39 is fastened to the frame 100 by the screws 72 at both ends. It is possible to remove the guide unit 39 by removing the screws 72 and pulling the guide unit 39 from the frame 100. By removing the guide unit 39, the contact glass 41 on the second reading means 40 is exposed. This makes it easy to clean the contact glass 41 and the guide 49 facing the contact glass 41. After cleaning, the parts are assembled in the reversed order of disassembling.

Other than the configuration described above, in order to expose the contact glass 41 and the guide 49 by opening the linear transportation path 90, it is also acceptable that the guide 49 is disposed on the discharge roller shaft as a pivot at downstream in the direction of original transport so that the guide 49 can swing freely to expose the contact glass 41 and the guide 49 of the second reading means 40. This modified embodiment of the present invention does not require removal of the screws, so maintenance can be performed in a shorter period of time.

Figure 10A:
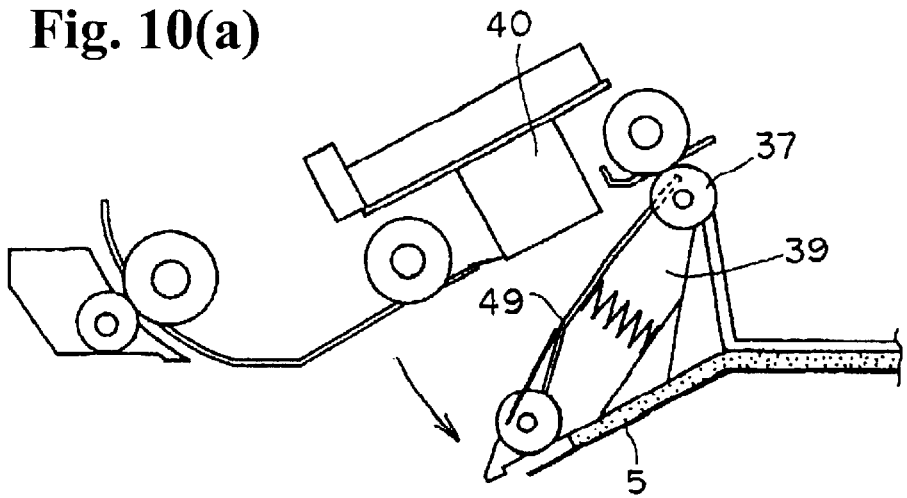
FIGS. 10(a), 10(b) are conceptual views showing a variation of the detachable configuration of the guide unit according to the present invention.
Figure 10B:
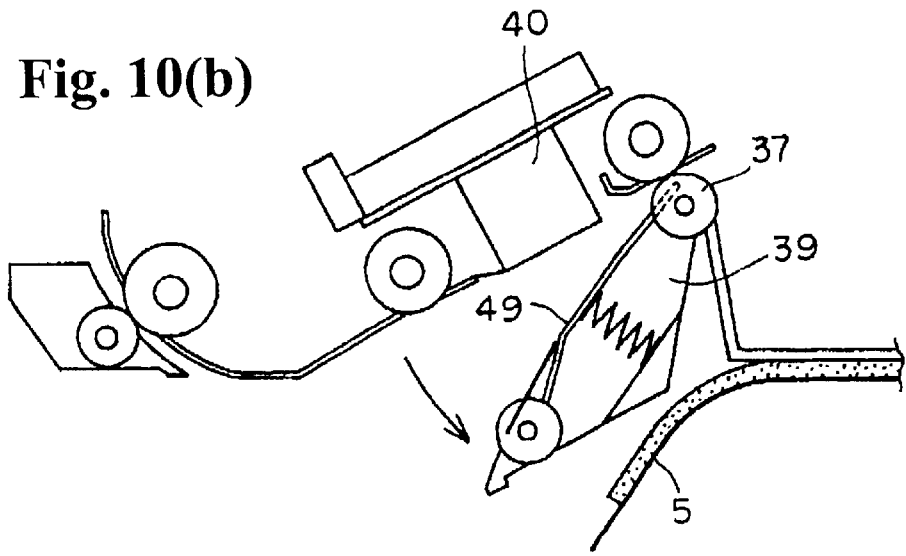

The following explains a modified embodiment of the present invention according to FIG. 10 (a) and FIG. 10 (b).

As shown in FIG. 10 (a), the guide unit 39 is integrally mounted to a portion of the pressing cover 5 and is configured to rotate around the rotational shaft of one of the paired discharge rollers 37. Through this configuration, the guide unit 39 rotates with respect to the side plate of the frame 100 thereby allowing the contact glass 41 surface and the guide 49 surface of the second reading means 40 to be exposed. It is also possible to use any known attaching means instead of using the screws to mount the guide unit 39 and the pressing cover 5 to the frame 100.

FIG. 10 (b) shows the guide unit 39 rotating around the rotational shaft of one of the paired discharge rollers 37 after removing a part of the pressing cover 5 from the frame 100. It is also possible that the pressing cover 5 uses no screws with regard to the frame 100. Velcro tape, for example, can be used to detachably mount the pressing cover 5.

S1 is an empty sensor that detects the originals on the sheet supply tray 30; S2 is a register sensor that detects a leading edge of the originals to execute the resister operation; S3 is a read sensor that detects a leading edge of the originals to set a read timing; and S4 is a discharge sensor that confirms discharge of the originals.

By receiving signals from each of the aforementioned sensors, instructions and information from the document image reading apparatus 1, a control device (not shown) including a CPU that controls each of the motors executes paper feed, transport and discharge, thereby reading the originals.

Figure 11:
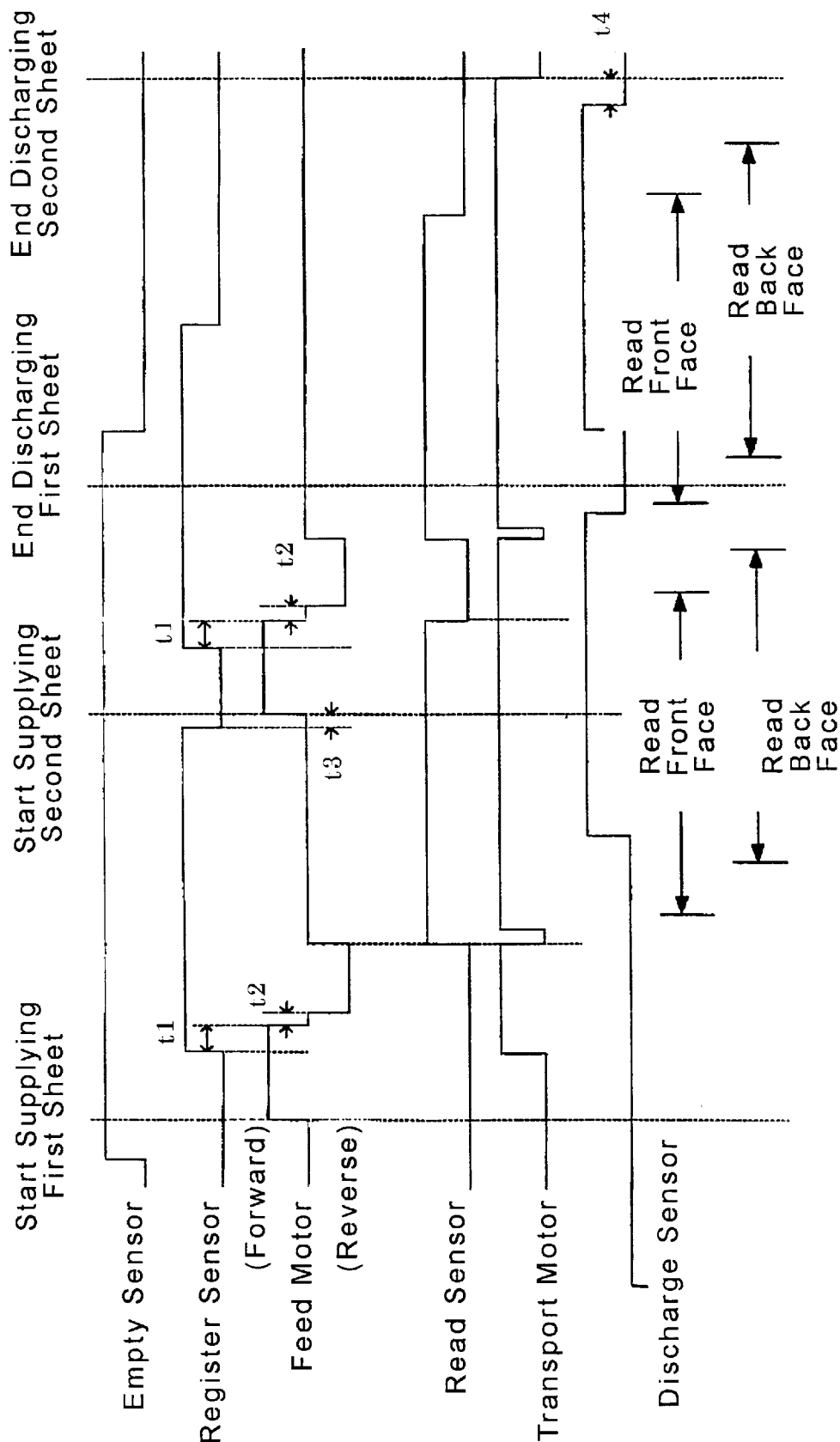
FIG. 11 is a timing chart of the operation of the automatic document feeder according to the present invention.

Next, an original feeding operation when reading both sides thereof will be explained according to the timing chart in FIG. 11.

First, upon the control device receiving a paper feed instruction signal from the main unit, the empty sensor S1 confirms whether or not the originals are stacked on the sheet supply tray 30. Then, when the originals are confirmed to be on the sheet supply tray 30 by the empty sensor S1, feeding of the first original starts.

The originals on the sheet supply tray 30 are drawn out by the pickup roller 31, and are separated into a single sheet and fed by the separating means comprising the paper feed roller 32 and the separation pad 33. Then, when the register sensor S2 detects a leading edge of the original, the original is moved for a predetermined period of time (t1) from a point at which it is detected, and stops. Through this, the leading edge of the original abuts a nip of the paired resister rollers 34 and bends thereby aligning the leading edge of the original and eliminating skews. Subsequently, after a predetermined period of time passes (t2), the paired resister rollers 34 are driven, and the original is sent by the paired resister rollers 34 and the paired transport rollers 35.

Then, the read sensor S3 detects the leading edge of the original, and the original stops after a predetermined period of time (t3). The leading edge of the original at this time is stopped at a position before the first contact glass 10.

Later, through the read instruction from the original image reading apparatus 1, the original is driven again at a reading speed, and passes through the first reading position X1 and the second reading position X2 by the paired transport rollers 35, the paired transport rollers 36 and the paired discharge rollers 37. In the process of passing through the first reading position X1 and the second reading position X2, both sides of the original are read by the first reading means 20 and the second reading means 40.

After transported in one direction by the paired transport rollers 35, 36 and the paired discharge rollers 37, and both sides are read, the original is discharged to the discharge tray 38 by the paired discharge rollers 37. The discharge sensor S4 confirms that the original is stored in the discharge tray 38 by detecting the trailing edge of the original.

Here, at a point when the register sensor S2 detects the trailing edge of the original transported in one direction by the paired transport roller 35, 36 and the paired discharge rollers 37, feeding of a second original starts after a predetermined period of time has passed and after the original has passed the resister sensor S2, if subsequent original is detected on the sheet supply tray 30 by the empty sensor S1.

In this way, the second and subsequent originals are fed and controlled in the same manner as the first original. When the last original has passed the first and second reading positions X1 and X2, respectively, and both sides of the original are read, the transport operation of all of the originals is completed when a predetermined period of time elapses (t4) after the discharge sensor S4 confirms the discharge of the last original to the discharge tray 38.

Next, a mounting structure of the second reading means 40 and an adjustment method of the reading line inclination will be explained according to FIG. 12 and FIG. 13.

Figure 12:
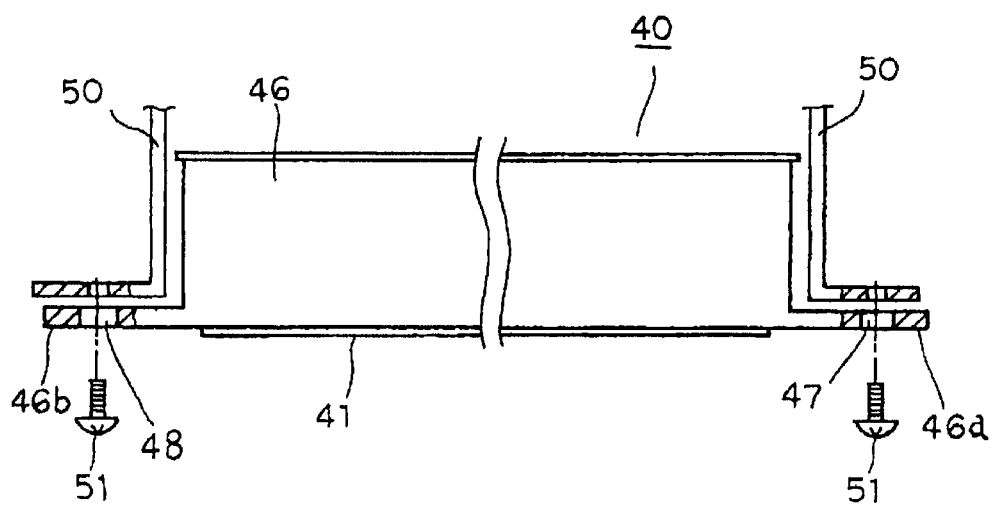
FIG. 12 is a conceptual view of an adjustment mechanism of the reading line of the contact image sensor type (second reading means) optical unit according to the present invention.

As shown in FIG. 12, the holder 46 on the second reading means 40 is provided with a first and a second mounting parts 46a and 46b on both ends in a length direction to mount the second reading means 40. To the first mounting part 46a and the second mounting part 46b on the holder 46 are formed a first and a second mounting holes of 47 and 48. Through these mounting holes of 47 and 48, the holder 46 and the second reading means 40 are mounted to an automatic document feeder side plate 50 using mounting screws 51 as fastening members.

Figure 13:
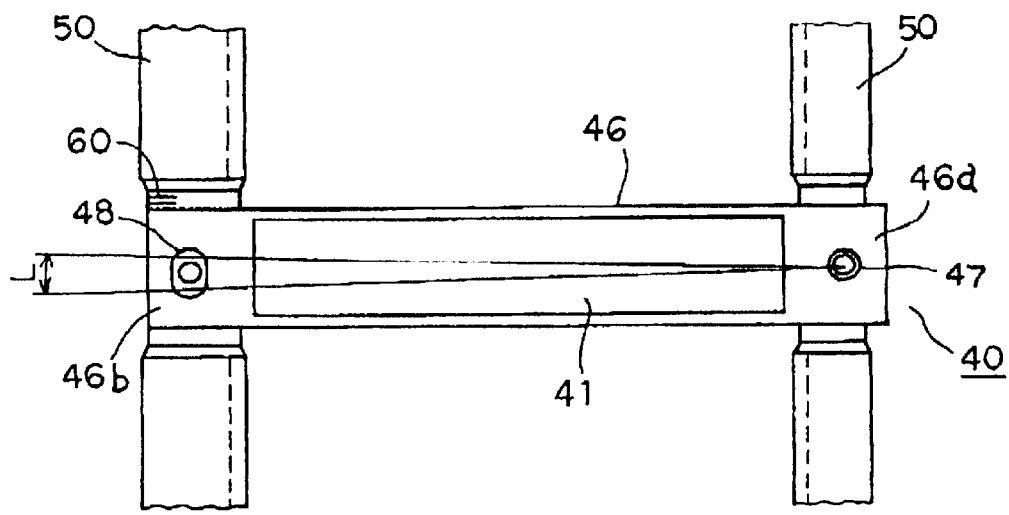
FIG. 13 is a conceptual view of adjustment method of the reading line of the contact image sensor type (second reading means) optical unit according to the present invention.

As can be seen in FIG. 13, with regard to the first and the second mounting holes 47, 48 for mounting the holder 46 to the side plate 50, the first mounting hole 47 on the rear side of the document image reading apparatus 1 is formed so that the mounting screw 51 penetrates and the holder 46 does not move. The second mounting hole 48 on the front side of the document image reading apparatus 1 is elongated to allow the holder 46 to move. This structure allows the holder 46 to swing in the range of L corresponding to the elongated hole 48, as shown in the FIG. 13, in the second mounting hole 48 around the mounting screw 51 position that penetrates the first mounting hole 47 as a pivot.

Also, to a mounting surface of the side plate 50 attached to the second mounting part 46b on the holder 46 are disposed a plurality of indicators 60 in even intervals to indicate the holder position to adjust a reading line with regard to the original.

This structure allows the reading line of the second reading means 40 to be adjusted using a process described below.

In the case that the reading line is inclined with regard to the original surface, first the automatic document feeder 2 is rotated, as shown in FIG. 1. Then, as shown in FIG. 6, the pressing cover 5 disposed on the bottom surface of the automatic document feeder 2 is bent. The guide unit 39, which combines the guide 49 facing the contact glass 41, one of the paired transport rollers 36 and one of the paired discharge rollers 37 in a single body, is removed from the side plate of the automatic document feeder to expose the mounting part of the second reading means 40, namely the mounting parts of 46a and 46b of the holder 46. With the mounting parts of 46a and 46b exposed, the mounting screws 51 is loosen to adjust the holder 46 by swinging the second mounting hole 48 side around the mounting screw 51 that penetrates the first mounting hole 47 as a pivot using the indicators 60 as a guide. After adjustment, the mounting screws 51 are tighten to fasten the holder 46.

This allows the reading line offset to be adjusted even after the automatic document feeder 2 is mounted to the document image reading apparatus 1. Furthermore, as the adjusting side of the second reading means 40 is set on the front of the document image reading apparatus 1 and the indicator is provided, fine adjustments are possible.

According to the embodiment of the present invention described above, in order to expose the vicinity around the mounting parts 46a and 46b on the second reading means 40 as widely as possible for easy adjustment, the adjustment guide 49, one of the paired transport rollers 36 and one of the paired discharge rollers 37 are integrated into a single body of the guide unit 39, but it is also acceptable to make only the guide 49 detachable.

Furthermore, the guide unit 39 may be structured not to detachable, but to rotate around a part of the guide unit to expose the mounting parts of the first reading means 20.

Figure 14:
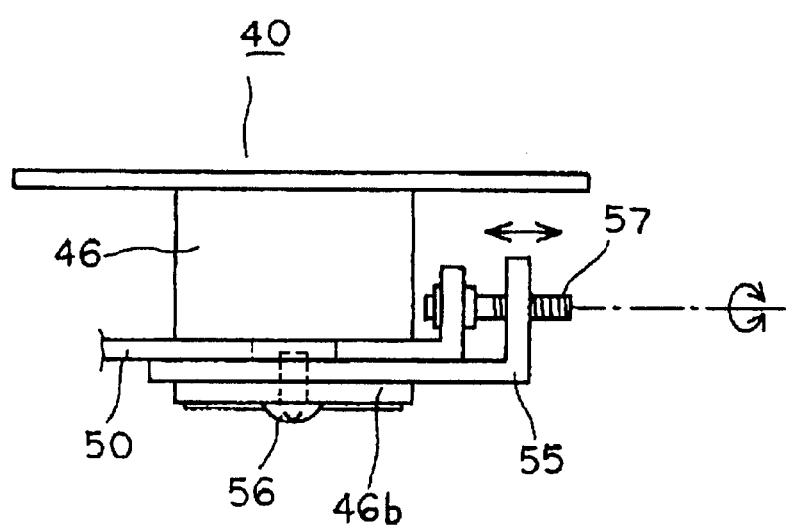
FIG. 14 is a conceptual view showing another embodiment of the reading line adjustment mechanism according to the present invention.
Figure 15:
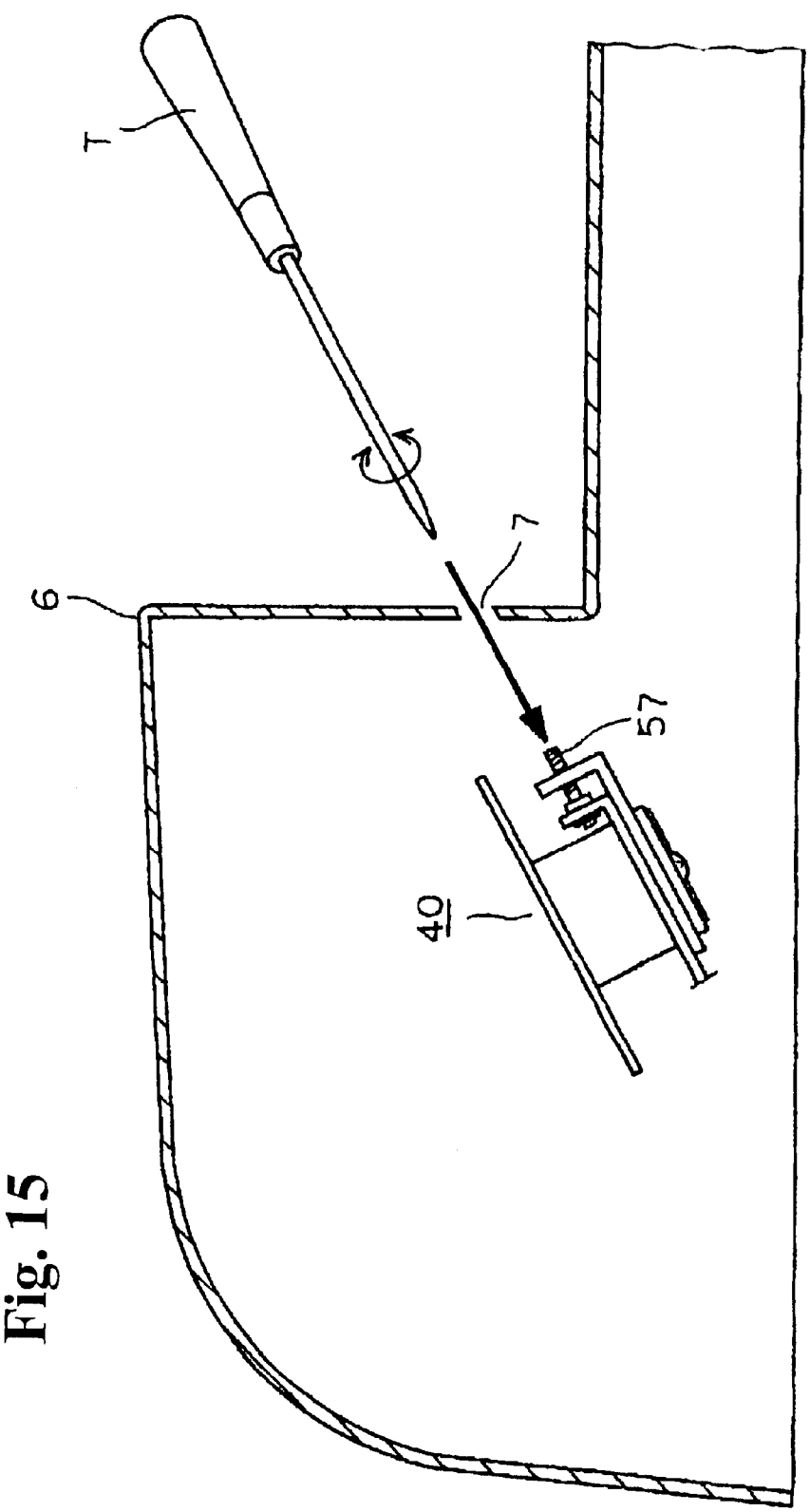
FIG. 15 is a conceptual view showing the adjustment method of the reading line adjustment method of another embodiment of the present invention.

Next, in explaining another embodiment shown in FIG. 14, the holder 46 of the second reading means 40 is mounted to an adjustment plate 55 using mounting screws 56, and the adjustment plate 55 is mounted to a side plate 50 on the automatic document feeder 2 as an adjustment member using adjustment screws 57. One side of the adjustment screw 57 is mounted to the side plate 50 to rotate, and the other side is provided with taps to support the adjustment plate 55 to move.

By rotating the adjustment screw 57 by a tool such as a screwdriver, the adjustment plate 55 moves thereby swinging the holder 46 mounted to the adjustment plate 55 around the first mounting part 46a as a pivot. This makes it possible to adjust the reading line of the second reading means 40.

In addition, as shown in FIG. 8, if the hole 7 to adjust the adjustment screw 57 by rotating is formed on an outer cover 6 of the automatic document feeder, it is possible to adjust the reading line from outside of the cover using a tool such as a screwdriver T. At this time, the first mounting part 46*a* as a pivot is mounted to the side plate 50 to swing while its position is fixed, but it is preferable for the first mounting part 46*a* to form a hole on the outer cover from which a mounting screw can be turned from outside of the cover as well.

Thus, according to the above embodiment of the present invention, the second reading means is a unit structure with the SELFOC lens, the image sensors, the image processing printed circuit board, the LED light source and the contact glass mounted to the holder, but it is not essential for all to be structured as a unit. It is also possible to structure only selected parts into a unit according to a configuration of an apparatus. For example, it is acceptable to mount the image processing printed circuit board and the contact glass to another, separate member.

What is claimed is:

1. An image reading apparatus for reading both sides of an original, comprising:

a platen for reading the original;

first reading means for reading one side of the original that moves over said platen;

an original supply tray for stacking the original;

a discharge tray for storing the original that has been read;

an original transport path having a feed path for guiding the original on the original supply tray to the platen, and a discharge path for lifting and discharging the original from the platen to the discharge tray, and forming a straight line oblique with regard to the platen; and second reading means for reading the other side of the original disposed in the discharge path that is linear between the platen and the discharge tray.

2. An image reading apparatus according to claim 1, wherein said original transport path connecting the original supply tray and the discharge tray forms a U-shape path, and said second reading means is disposed inside the U-shaped transport path.

3. An image reading apparatus according to claim 2, wherein said second reading means is equipped with a SELFOC lens of a contact image sensor type.

4. An image reading apparatus for reading both front and back sides of an original, equipped with an automatic document feeder mounted on the image reading apparatus to open and close the same, comprising:

a platen for reading the original;

first reading means that moves to read the original placed upon the platen stationary as well as reads one side of the original moving over the platen;

cover means for covering at least a part of the platen;

an original supply tray for stacking the original;

a discharge tray for storing the original that have has been read;

an original supply path for guiding the original on the original supply tray to the platen;

a discharge path disposed on the cover means for lifting the original from the platen and guiding it to the discharge tray;

second reading means disposed in the discharge path for reading the other side of the original; and guide means disposed to the second reading means and forming a part of the discharge path to guide the original that has been read by the second reading means, said guide means being detachable from the cover means to expose an original reading surface of the second reading means.

5. An image reading apparatus according to claim 4, wherein said platen includes a first contact glass on which the original is placed stationary to be read by the first reading means that moves, and a second contact glass over which the original passes from a transport path to be read by the first reading means that is stationary, and said cover means covers the first contact glass.

6. An image reading apparatus according to claim 5, wherein said cover means is configured such that at least a bottom portion of the guide means is detachable.

7. An image reading apparatus according to claim 4, wherein a pair of first rollers and a pair of second rollers for transporting originals are disposed front and back portions of the second reading means in the discharge path, and the guide means is disposed to guide the originals from the pair of first rollers to said pair of second rollers.

8. An image reading apparatus according to claim 7, wherein said guide means facing the reading surface of the second reading means, urging means for urging the guide means to the reading surface of the second reading means, one of the first paired rollers and one of the second paired rollers are integrated as a single guide unit, and said guide unit is mounted to the cover means to be detachable.

9. An image reading apparatus for reading an original, equipped with an automatic document feeder mounted on the image reading apparatus to open and close the same, wherein said automatic document feeder is equipped with reading means for reading images on the original and support means for supporting the reading means to swing in an original transport direction to adjust inclination of the reading means in the original transport direction.

10. An image reading apparatus according to claim 9, wherein said automatic document feeder is mounted to the image reading apparatus so that a front side of the automatic document feeder can open with a rear side of the image reading apparatus as a pivot, and said support means supports the reading means to swing such that a front side of the reading means can swing in the original transport direction with respect to a read side of the reading means as a pivot.

11. An image reading apparatus according to claim 9, further comprising a plurality of indicators for adjustment disposed in the original transport direction to indicate a position of the reading means.

12. An image reading apparatus according to claim 9, further comprising adjustment means for adjusting an inclination of the original transport direction of the reading means supported by the support means.

13. An image reading apparatus according to claim 12, wherein said adjustment means includes an adjustment screw disposed between the reading means and the support means and connecting the reading means and the support means.

* * * * *